United States Patent [19]

Baker

[11] 4,379,175

[45] * Apr. 5, 1983

[54] PREPARATION OF LOW FAT IMITATION CREAM CHEESE

[75] Inventor: Donald B. Baker, Tulsa, Okla.

[73] Assignee: The Pro-Mark Companies, Tulsa, Okla.

[*] Notice: The portion of the term of this patent subsequent to Jan. 13, 1998, has been disclaimed.

[21] Appl. No.: 285,630

[22] Filed: Jul. 21, 1981

Related U.S. Application Data

[63] Continuation-in-part of Ser. No. 224,207, Jan. 12, 1981, abandoned, which is a continuation-in-part of Ser. No. 9,466, Feb. 6, 1979, Pat. No. 4,244,983.

[51] Int. Cl.³ .................... A23C 19/08; A23C 20/00
[52] U.S. Cl. .................... 426/582; 426/35; 426/38; 426/39; 426/334
[58] Field of Search .................... 426/34, 33, 35, 36, 426/38, 39, 40, 334, 582

[56] References Cited

U.S. PATENT DOCUMENTS

| | | | |
|---|---|---|---|
| 3,156,568 | 11/1964 | Hargrove et al. | 426/36 X |
| 3,232,768 | 2/1966 | Van Wieren et al. | 426/334 |
| 3,298,836 | 1/1967 | Ernstrom | 426/582 X |
| 3,929,892 | 12/1975 | Hymes et al. | 426/582 |
| 4,065,580 | 12/1977 | Feldman et al. | 426/33 |
| 4,244,983 | 1/1981 | Baker | 426/582 |

*Primary Examiner*—David M. Naff
*Attorney, Agent, or Firm*—Sixbey, Friedman & Leedom

[57] ABSTRACT

An imitation cream cheese product suitable for low calorie and low fat diets, having a fat content less than about 4% by weight and a method for making such a product having the appearance, texture and taste of cream cheese is provided. The low fat cream cheese type product is prepared by admixing milk, a fat-containing carrier and stabilizers, heating the mixture at about 150° to 200° F., preferably about 170° to 185° F., and admixing with cottage cheese curd. Preservatives and flavorings may be added before and/or after heating to 150° F., to customize the taste and shelf stability characteristics of the cream cheese type product. The temperature of the milk-fat carrier-stabilizer-curd mixture is controlled to the range 70° to 160° F., preferably 145° to 150° F., to prevent stabilizer setting, to allow use of temperature sensitive flavorants and to maintain a fluid consistency suitable for pumping. The mixture is homogenized, molded to shape and packaged in suitable containers. The resulting product will generally have a shelf life of at least about 90 days with conventional refrigeration.

9 Claims, No Drawings

PREPARATION OF LOW FAT IMITATION CREAM CHEESE

CROSS-REFERENCE TO RELATED APPLICATIONS

This application is a continuation-in-part of application Ser. No. 224,207, filed Jan. 12, 1981, now abandoned which application was, in turn, a continuation-in-part of application Ser. No. 009,466, filed Feb. 6, 1979, now U.S. Pat. No. 4,244,983.

BACKGROUND OF THE INVENTION

1. Field of the Invention

The present invention relates generally to a method for making a cream cheese type product having the appearance, taste, consistency and texture of cream cheese and, more specifically, to a method for making an imitation cream cheese product having a fat content significantly below that of conventional cream cheese and of heretofore known imitation cream cheeses.

2. Description of the Prior Art

In recent years, for health as well as cosmetic reasons, there has developed an increasing concern with diet which has focused on diets that reduce calorie and fat consumption. Low calorie foods which look and taste like their higher calorie counterparts have been eagerly sought by the public. To this end food researchers have concentrated on developing food products which are nutritious and palatable, but which contain substantially reduced levels of high calorie and/or fatty components. This is particularly true in the dairy industry where such low calorie, low fat products as skim milk, yoghurt, and the like have been successfully marketed. However, the high fat levels in some dairy products, such as cream cheese, have heretofore been thought to be necessary to maintain a desirable creamy mouth feel and to avoid the powdery, grainy mouth feel associated with prior low fat forms of cream cheese. As a result, those choosing to reduce their caloric or fat intake have usually omitted high fat dairy products, such as cream cheese, from their diets.

At least partially in response to the desire of the dieting public to continue to partake of these heretofore high fat dairy products, efforts have been made to develop imitation cream cheeses which contain reduced fat contents and, therefore, reduced calorie levels. Exemplary efforts in this regard are disclosed in U.S. Pat. Nos. 2,160,159 to Lundstedt et al. and 3,929,892 to Hynes et al. However, the fat content of the cheese products produced by the methods of these patents still exceeds about 10% fat, a content which is unacceptably high from the standpoint of those desiring or required to reduce their caloric or fat intake.

Moreover, some of these prior art methods require involved processing steps and/or impose ingredient standards which are unrealistically difficult or expensive to meet. For example, Hynes et al. describe a process for making an imitation cream cheese which involves difficult and/or expensive procedures such as successive heating steps, denaturation of serum proteins in the presence of casein to achieve the desired features of the therein described invention, and close ingredient control to achieve a prescribed level of lactose in the final product.

SUMMARY OF THE INVENTION

It is, therefore, a primary object of the present invention to provide a cream cheese type product which resembles conventional cream cheese in appearance, texture and taste, but which has a fat content substantially below that of conventional and existing imitation cream cheese products.

It is another object of the present invention to provide a nutritious, palatable imitation cream cheese product which has a creamy mouth feel similar to conventional cream cheese and which has a fat content substantially below 10% by weight.

It is still another object of the present invention to provide a method for making a low fat imitation cream cheese product.

Other objects and advantages will become apparent from the following description and appended claims.

In accordance with the aforesaid objectives, the present invention provides a process for making a low calorie, low fat cream cheese type product resembling cream cheese in appearance, texture and taste which includes the steps of admixing milk, a fat-containing carrier and a stabilizer and heating the mixture to a temperature in the range from about 150° to 200° F., preferably 170° to 185° F., with constant agitation. Preferably, while the mixture continues to be agitated, other conventional ingredients intended to increase the product's shelf life, improve its taste and adjust its texture are added. Such additional common ingredients may include preservatives, flavorings, edible acids, and the like. Cottage or bakers cheese curd, which is the major constituent of the cream cheese type product prepared hereby, is added to the mixture and the temperature of the mass is adjusted to and maintained at not less than about 70° to 160° F., preferably 145° to 150° F. Additional flavorings and/or flavor influencing additives, particularly temperature sensitive flavorings, may be added once the mixture achieves the desired 70° to 160° F. temperature range. The resulting substantially uniform mixture is pumped to a homogenizer where it is homogenized under conventional elevated pressure conditions of 500 to 5000 psig, preferably 1200 to 1500 psig. Following homogenization, the cheese product is molded and packaged in convenient shapes in a conventional manner.

The imitation cream cheese type product of the present invention comprises a major amount of pasteurized, homogenized cultured skim milk and minor amounts of flavorants and stabilizers. Most importantly, the product of the present invention has a total fat content by weight of less than about 4% fat and contributes only about 60 calories per serving (about 20-25 calories per ounce) to the diet. It is a smooth palatable product resembling cream cheese in appearance, texture and taste. Desirably, the product has a pH in the range 4.2 to 5.0, preferably 4.5 to 4.8, a total solids content of about 17.5 to 24%, preferably 20 to 22%, and a fat content not less than about 0.5%.

DETAILED DESCRIPTION OF THE INVENTION

The present invention relates broadly to a soft, imitation cream cheese type product which resembles cream cheese in appearance, texture and taste, but which has a fat content which is substantially reduced below the fat content of conventional cream cheese. As a result, the imitation cream cheese made by the method of the present invention is a desirable component of the diet of persons desiring to decrease their caloric intake and to reduce the fat content of their diet.

The process by which the unique imitation cream cheese type product of the present invention is made involves forming a mixture of milk, a fat-containing carrier, stabilizers and flavorings at a temperature ranging from about 150° to 200° F., preferably 170° to 185° F. and adding cottage cheese curd while adjusting the resulting temperature to the range of about 70° to 160° F., preferably 145° to 150° F. In this 70° to 160° F. temperature range the temperature is high enough that the stabilizers will not tend to set yet low enough that temperature sensitive flavorants, such as volatile flavorants and bacterial cultures, can be added if desired. Agitation of the mixture is continuous throughout the process to the end that, following curd and temperature sensitive flavorant addition, the final mix is substantially uniform and readily pumpable to a homogenizer for high pressure homogenization. This latter procedure may be controlled, as is well known in the art, to adjust the firmness of the cheese product which results.

In order to prepare an imitation cream cheese having a fat content not greater than about 4% by weight, the fat contributing ingredients, primarily the milk and the fat-containing carrier, must be selected and carefully proportioned. In so doing it should be borne in mind that many dairy flavorants which might subsequently be used can contribute to the fat content of the final cream cheese product. However, inasmuch as flavorants are generally employed in very small quantities, particularly as compared with the milk and fat-containing carrier ingredients, their contribution to the final fat content may not be significant.

The term "milk" as used herein means the conventional milk of commerce which may have a butter fat content ranging from as low as 0.01% up to 7%. Within this range are conventional skim milk (less than about 0.5% by weight butter fat) and conventional full fat milk (up to about 3.5% by weight butter fat). The term "fat-containing carrier" as used herein means a milk or vegetable fat containing carrier which is suitable for admixture with milk to adjust the fat content thereof. Such fat-containing carriers may comprise or contain vegetable fats such as coconut oil, soybean oil, peanut oil, safflower oil, and the like. Most preferred, however, are milk fat carriers such as the conventional dairy cream of commerce which may have a butter fat content of 30% or higher. The term "milk" also contemplates equivalent compositions formed by suitable admixtures of milk solids and water.

It will be appreciated that various proportioned mixtures of milk and fat-containing carrier can achieve a desired fat content within the desired range of less than about 4% fat by weight. However, it should also be recognized that it is important to develop a suitable fluidity in the mixture for ease of processing and, ultimately, to develop the desired texture in the cream cheese type product. Therefore, the selection of milk and fat-containing carrier proportions should take into account the importance of maintaining a convenient moisture content in the mixture during processing as well as the need for achieving a particular fat content. In so doing it is important to appreciate that the major ingredient of the cream cheese type product is dry cottage cheese curd. Dry cottage cheese curd is a well known dairy product which is a drained, uncreamed cheese curd made by known procedures from skim milk. Generally, dry cottage cheese curd comprises about 15 to 25% by weight non-fat milk solids and 75 to 85% by weight water. When used herein, the term "dry cottage cheese curd" refers to a cottage cheese or bakers cheese curd product having these characteristics.

To prepare the imitation cream cheese product of the present invention, the selected milk and fat-containing carrier components are admixed with a stabilizer, usually in a stainless steel vat or like mixing container, and heated to a temperature in the range 150° to 200° F., preferably 170° to 185° F. for a time sufficient to achieve complete blending of the ingredients, to form a uniform, substantially homogeneous mixture and to effect pasteurization. The preferred milk is skim milk having a butter fat content of 0.5% or less. The preferred fat-containing carrier is cream which contains about 30% butter fat. The heating time and the temperature to which the mixture is heated generally have an inverse relationship with increased temperatures requiring decreased heating times. Experience has indicated that heating at about 185° F. for five minutes is sufficient to achieve the desired purpose. At lower temperatures heating may continue for from 15 to 30 minutes. Heating is typically indirect and is accomplished by passing pressurized steam through conduits which jacket or are disposed within the mixing vat. Therefore, relatively close temperature control can be maintained by controlling steam flow through the conduits. Mixing of the ingredients may be accomplished in any desired fashion, e.g. by paddle blender agitation, use of recirculating pumps, or both.

The stabilizer or combination of stabilizers employed may be selected from any of a number of commercially available dairy product stabilizer bases. Typically useful stabilizers contain hydrocolloids such as fruit pectin, pectic acid, alginic acid (as well as suitable sodium and calcium compounds), tetrasodium pyrophosphate, agar-agar, carageenan, guar meal or flour, carob-bean meal or flour, enriched starches, starch meal or powder. A preferred stabilizer combination which has been found to work well in the method of the present invention comprises a mixture of guar gum, pectin, agar-agar and tetrasodium pyrophosphate.

To the heated and agitated mixture of milk, fat-containing carrier and stabilizers is added dry cottage cheese curd in sufficient quantity that the curd comprises from 50 to 85%, preferably 60 to 65%, by weight of the total ingredient mix (excluding flavorants). Agitation of the mixture is continuous to allow the curd to become substantially completely coated and intermingled with the milk-fat-containing carrier-stabilizer mixture which serves as a dressing therefor. Since the cottage cheese curd was likely to have been refrigerated at about 40° F. prior to use, the addition of the curd will cause the overall temperature of the mixture to decrease substantially. Therefore, close temperature monitoring and control should be practiced to maintain the mixture at a temperature not less than about 70° to 160° F., preferably 145° to 150° F. If the temperature drops below about 70° F., the stabilizers will begin to set with the result that the uniformity and fluidity of the mixture will be diminished and the flavor-influencing bacterial cultures, if used, will not function effectively. At temperatures above about 160° F., certain flavorants may be volatilized and flavor-influencing bacterial cultures, if used, may be killed.

Preservations and flavorants may be added at any point in the process, e.g., to the milk-fat-containing carrier-stabilizer mixture prior to curd addition or to the milk-containing carrier-stabilizer dressed curds, or to both, depending upon the temperature sensitivity of the additives and the convenience of addition. Thus, it is desirable to add flavorants and preservatives which will not be volatilized or rendered ineffective by high temperatures directly to the milk-fat-containing carrier-stabilizer mixture since the heat, together with the continuous agitation, facilitates their dissolution in the mixture.

Any conventional, food grade, FDA approved preservative may be employed to inhibit mold formation and other deterioration and to increase shelf life. Typical of the desirable preservatives is potassium sorbate, a well known bacteriostat, anti-oxidant and mold inhibitor, although other suitable preservatives, e.g., benzoate of soda, may be used. Typically, preservatives are employed in only trace quantities, e.g., about 0.1%.

Likewise, any food grade, FDA approved flavorant may be used to adjust the taste of the imitation cream cheese product. Inasmuch as flavoring is a very subjective area, and since tastes differ so widely, each producer of imitation cream cheese will likely select the flavorant or combination of flavorants which it believes most closely approximate the taste of conventional cream cheese. Thus there are no flavorants whose use is indispensible to producing an acceptable product. It is worthy of note, however, that experience has suggested use of salt (sodium chloride) and an edible acid to assist in adjusting the flavor of the cream cheese type product. The edible, food grade, FDA approved acid may be any one of the many which are available, e.g., lactic acid or citric acid. Exemplary of other flavorants which may be desirable for use are concentrated cultured dairy flavorings comprising lipase modified butter fat products which are rich in volatile, flavorful fatty acids. One such product is commercially available from Dairyland Food Laboratories under the trade designation "LBO" 50. Typically flavorants are employed in quantities ranging from trace amounts up to about 3% by weight.

Where temperature sensitive flavorants are to be employed, they should not be added until the temperature of the milk-fat-containing carrier-stabilizer dressed cottage cheese curd has been reduced to the 70° to 130° F. range. Illustrative of flavorants which fall into this category are buttermilk flavor (a non-fat artificial flavor) and bacterial cultures. The latter generally require about 24–48 hours to become active and contribute to flavor. Exemplary of useful commercially available cultures are those containing streptococcus diacetilactus or other lactic acid-producing bacterial cultures.

After all desired ingredients have been thoroughly admixed, which generally requires about fifteen minutes of blending, and with temperature maintained in the range from about 70° to 160° F., a substantially uniform and fluid mixture is formed which can be directed, preferably by pumping, to a conventional homogenizer unit. In the unit the mixture is homogenized at pressures in the general range of 500 to 5000 psig. It has been found that a desirably firm imitation cream cheese product will result from a homogenization pressure in the range 1200 to 1500 psig. The resulting product has a smooth, creamy appreance and a texture and taste very closely approximating that of conventional cream cheese.

The homogenized product is shaped, as by molding, to convenient sizes and forms and packaged in conventional manner for cream cheese and like products. When the product is stored at standard refrigeration temperatures it has a usual shelf life of not less than about 90 days.

The following example illustrates the practice of the present invention and is intended to exemplify and not to limit in any respect the content and scope thereof.

EXAMPLE

The following ingredients were mixed in the amounts indicated in a stainless steel vat equipped with an agitator:

| | |
|---|---|
| skim milk (less than 0.5% butter fat) | 405.0 lbs. |
| cream (30% butter fat) | 560.0 lbs. |
| stabilizer consisting of guar gum, pectin, agar-agar & sodium pyrophosphate | 47 lbs. |

Mixing was carried out using paddle blenders and a recirculating pump while the contents of the vat were heated by pressurized steam in the vat jacket to 185° F. After five minutes the pump was shut down and only blender agitation continued. Steam flow through the jackets was cut off and the contents of the vat allowed to cool down. To the milk-cream-stabilizer mix, the following preservative and flavoring ingredients were added in the amounts noted:

| | |
|---|---|
| potassium sorbate | 4.5 lbs. |
| salt | 45 lbs |
| Dairyland Food Labs "LBO" 50 flavoring | 27 lbs. |
| citric acid | 3.6 lbs. |

The mixture was constantly agitated during addition of the above ingredients. Temperature was monitored to assure that the temperature of the mixture remained about 145° F. 1,782 pounds of refrigerated (40° F.) cottage cheese curd were then stirred into the already admixed ingredients. Steam flow through the jackets was resumed to maintain the temperature at about 145° to 150° F. Agitation was continued to permit the cottage cheese curd to become intimately intermingled with and coated by the milk-cream-stabilizer dressing. Four and one half gallons (about 38.7 lbs) of conventional buttermilk flavor and 12 ounces of streptococcus diacetilactus culture were mixed into the curd-containing mixture and blending continued for at least an additional 15 minutes to assure formation of a uniform, fluid, readily pumpable mix. The resulting mixture was pumped to a homogenizer where it was homogenized at between 1200 psig and 1500 psig before being packaged and refrigerated. The final product resembled cream cheese in color, appearance, texture and taste, contained about 3.7% fat, about 21% solids and had a pH of about 4.7. The imitation cream cheese product contained about 22 calories per ounce.

While the present invention has been described with reference to specific embodiments thereof, it will be understood that numerous modifications may be made by those skilled in the art without actually departing from the scope of the claimed invention. Accordingly, all modifications and equivalents may be resorted to which fall within the scope of the invention as claimed.

I claim:

1. A method for making a low fat cheese product which resembles cream cheese in appearance, texture and taste comprising the steps of:
   (a) admixing milk, a milk fat-containing carrier having a butterfat content of at least 30% by weight and a stabilizer, the relative proportions of milk and milk fat-containing carrier being selected to provide a fat content in he cheese product from about 0.5% to less than 4% by weight;
   (b) heating said mixture to a temperature in the range from about 170° to 185° F. for a time sufficient to form a uniform substantially homogeneous mixture and to effect pasteurization;
   (c) admixing dry cottage cheese curd and said milk fat-containing carrier-stabilizer mixture to coat said cottage cheese curd therewith and to form a curd mixture wherein said curd comprises from 50 to 85% by weight of said curd and milk fat-containing carrier-stabilizer mixture;
   (d) agitating said curd and milk fat-containing carrier-stabilizer mixture to form a substantially uniform and fluid mixture while maintaining said curd mixture at a temperature in the range from about 70° to 160° F.;
   (e) adding flavorants comprising buttermilk flavor and bacterial culture to said agitated curd mixture from step (d);
   (f) adding flavorants comprising salt, an edible acid and lipase modified butterfat products and a preservative to said mixture at any time prior to step (g); and
   (g) homogenizing said curd mixture at pressures in the range 500 to 5000 psig.

2. A method, as claimed in claim 1, wherein said milk is skim milk.

3. A method, as claimed in claim 1, wherein said edible acid is citric acid.

4. A method, as claimed in claim 1, wherein said homogenization pressure is in the range 1200 to 1500 psig.

5. A method, as claimed in claim 1, wherein said mixture is heated to a temperature in the range from about 170° to 185° F. for about 5 minutes.

6. A method, as claimed in claim 1, wherein said curd mixture is maintained at 145°–150° F. during agitation.

7. A method, as claimed in claims 1 or 6, wherein said curd comprises from 60 to 65% by weight of said curd and milk-fat containing carrier-stabilizer mixture.

8. The low fat cheese product produced by the method of claim 1.

9. The low fat cheese product produced by the method of claim 7.

* * * * *